US010704623B2

(12) United States Patent
Mahana et al.

(10) Patent No.: US 10,704,623 B2
(45) Date of Patent: Jul. 7, 2020

(54) ROPE ARREST-AND-RELEASE DEVICE FOR USE ON UTILITY POLES

(71) Applicants: Cory Robert Mahana, Belgrade, MT (US); Stephen Sanford, Bozeman, MT (US); David Yakos, Bozeman, MT (US); Kyle Gunnarson, Bozeman, MT (US)

(72) Inventors: Cory Robert Mahana, Belgrade, MT (US); Stephen Sanford, Bozeman, MT (US); David Yakos, Bozeman, MT (US); Kyle Gunnarson, Bozeman, MT (US)

(*) Notice: Subject to any disclaimer, the term of this patent is extended or adjusted under 35 U.S.C. 154(b) by 651 days.

(21) Appl. No.: 15/431,888

(22) Filed: Feb. 14, 2017

(65) Prior Publication Data

US 2018/0231075 A1 Aug. 16, 2018

(51) Int. Cl.
*F16D 63/00* (2006.01)
*F16D 65/02* (2006.01)
*A62B 1/14* (2006.01)

(52) U.S. Cl.
CPC .............. *F16D 63/008* (2013.01); *A62B 1/14* (2013.01); *F16D 65/028* (2013.01); *F16D 2065/022* (2013.01)

(58) Field of Classification Search
CPC .................. F16D 63/008; F16D 65/028; F16D 2065/022; F16D 1/04; A62B 1/14; B66F 19/00
USPC ............... 254/134.3 PA, 391, 395, 134, 4 R; 182/5, 192, 193; 188/65.1; 24/134 R, 24/136 R
See application file for complete search history.

(56) References Cited

U.S. PATENT DOCUMENTS

| 3,098,638 | A | * | 7/1963 | McAuley | ................. H02G 1/04 254/134.3 PA |
| 3,640,504 | A | * | 2/1972 | Lindsey | ................... H02G 1/02 254/134.3 PA |
| 4,580,658 | A | * | 4/1986 | Brda | ......................... A62B 1/14 182/5 |
| 4,729,456 | A | * | 3/1988 | Sugiyama | .............. A62B 35/04 188/180 |
| 5,531,297 | A | * | 7/1996 | Pipan | ....................... B66D 5/16 24/134 R |
| 6,948,594 | B2 | * | 9/2005 | Hossler | ................... A63J 1/028 24/134 R |
| 7,775,254 | B2 | * | 8/2010 | Judkins | .................. E06B 9/324 160/178.2 |

(Continued)

*Primary Examiner* — Tyrone V Hall, Jr.
*Assistant Examiner* — Seahee Yoon
(74) *Attorney, Agent, or Firm* — Antoinette M. Tease

(57) ABSTRACT

A rope arrest-and-release device comprising a cam block assembly and a housing with front vertical rollers situated on either side of the housing, rear vertical rollers situated directly behind the front vertical rollers, and a pair of horizontal rollers situated to the interior of the front and rear vertical rollers on either side of the housing. The cam block assembly includes a cam block and a cam that rotates upward and downward via a spring. Each front vertical roller is configured to rotate forward to allow a rope to be inserted between the cam and the inside ceiling of the housing. The cam block assembly fits into an internal recess in the housing and is removable and reversible. The invention include a means for securing the device to a utility pole and for locking the cam in a downward (open) position.

10 Claims, 16 Drawing Sheets

(56) References Cited

U.S. PATENT DOCUMENTS

| | | | |
|---|---|---|---|
| 8,333,357 B2* | 12/2012 | Laughlin | F16G 11/101 24/134 R |
| 8,348,016 B2* | 1/2013 | Lewis | A62B 1/14 24/134 R |
| 8,820,487 B2 | 9/2014 | Bowman et al. | |
| 8,997,944 B1 | 4/2015 | Sadeck et al. | |
| 9,173,386 B2 | 11/2015 | Karpanty | |
| 9,186,527 B2 | 11/2015 | Bergmann et al. | |
| 9,365,400 B1 | 6/2016 | Sadeck et al. | |
| 2003/0094333 A1* | 5/2003 | Hossler | A63J 1/028 188/65.1 |
| 2004/0149970 A1* | 8/2004 | Kwon | H02G 1/04 254/134.3 PA |
| 2013/0056303 A1 | 3/2013 | Bergmann et al. | |
| 2014/0041282 A1 | 2/2014 | Karpanty | |
| 2014/0144729 A1 | 5/2014 | Bowman et al. | |
| 2016/0001100 A1* | 1/2016 | Hirst | A62B 1/14 182/236 |
| 2016/0258457 A1* | 9/2016 | Moine | A62B 1/14 |

\* cited by examiner

ROPE ARREST-AND-RELEASE DEVICE FOR USE ON UTILITY POLES

BACKGROUND OF THE INVENTION

1. Field of the Invention

The present invention relates generally to the field of rope brakes or rope arrest-and-release devices, and more particularly, to a device that releasably secures pulling rope to a utility pole and allows the rope to be pulled through the device in either horizontal direction.

2. Description of the Related Art

The process of installing power lines on utility poles is a hazardous one. Typically, the laying of power lines entails first constructing a series of utility poles and then stringing them with power lines. Before the power lines are strung, a pulling (or pilot) rope is strung through a pulley on certain of the utility poles. The pulling rope, which is usually made from a double braided polyester or composite material, is fed from spools on utility trucks. The rope is attached to electrical cable, which is then pulled through the pulleys by the rope and secured to the insulators on the utility poles. The stringing of the pulling rope through the pulleys on the utility poles is a dangerous and precarious task in that it involves a person climbing the utility pole with the rope and manually pushing the rope through each pulley. As this occurs, the rope must be maintained above the ground so as to avoid causing injury to persons or property; trucks or temporary structures are often used to serve this purpose.

To avoid some of the hazards associated with the stringing of power lines, helicopters have been used on occasion to string utility poles with pulling rope. As reported by *Lehigh Valley Live* on Jan. 20, 2016, PPL Corporation used a helicopter to string power lines in Bethlehem, Pa. In that instance, "[t]he pilot maneuver[ed] rope fed from spools onto pulleys on newly installed poles, to help later with stringing the power lines as part of the $12 million, 6-mile-long reliability upgrade." Id. The use of helicopters is not always practical or cost-effective, however.

The present invention eliminates virtually all of the safety hazards associated with the stringing of power lines by providing a mechanism by which the rope is secured to and released from each of the utility poles. This device includes a mechanism by which the rope may be released from the ground, and it incorporates structural features that allow the rope to be strung in either direction (left to right or vice versa). Furthermore, the present invention increases efficiency of operation and minimizes the potential for property damage by maintaining the pulling rope above the ground.

Although the prior art includes examples of rope arresting devices, none of these inventions incorporates the structural features and functional advantages of the present invention. U.S. Pat. No. 287,856 (Parsels, 1883) discloses a portable fire escape that incorporates a rope for escaping from a building. A wheel regulates a spindle, which places tension on a tongue. The rope lies between the tongue and a handle. This particular patent is an example of one of the earliest rope-arresting devices.

U.S. Pat. No. 1,340,146 (Blake, 1920) also involves a portable fire escape in which a tape is slidably mounted within a frame. The frame comprises an elongated body with rectangular channels extending inwardly from its ends. The body has an internal pocket with a recess, and the tape passes through the channels and the pocket. When pressure is applied to a spring on the front surface of the body, a block that is carried by the spring moves deeper into the recess, thereby causing a binding action between the tape and the body and also between the tape and a friction roller. This invention constitutes an early form of rappelling device.

U.S. Pat. No. 4,533,026 (Bernard, 1985) describes a load-carrying device that is moveable along a rope. The device is comprised of a casing formed of two cheeks, a shaft supported on the casing, and a pulley supported on the shaft. The rope enters the device via a diverter on one end of the casing, passes around the circumference of a pulley, and exits the device via a diverter on an opposite end of the casing. The centrifugal force of the pulley rotation causes a pawl to lock the pulley, thereby preventing its further rotation.

U.S. Pat. No. 6,378,650 (Mauthner, 2002) provides a rope brake in which a pair of rigid and parallel first and second side plates overlay a pivotally mounted pulley. The pulley pivots about an axis that extends orthogonally between the side plates, and a pair of rigid wedges are rigidly mounted between the side plates on opposite lateral sides of the pulley. A rope is compressed within gaps created by the wedges and the pulley, depending on whether the pulley is in a first or a second position.

U.S. Pat. No. 7,658,264 (Mauthner, 2010) discloses a rope brake comprised of a supporting plate with a one-way pulley sheave rotatably mounted to the supporting plate. A fixed brake member is rigidly mounted to the supporting plate, and a rope passes through a gap in the device formed by a fixed member and a movable member. The rope pinching member is configured so that when the sheave is freewheeling in a first rotational direction, the rope passes freely through the pinching opening, and when the sheave rotates under load in an opposite rotational direction, the moveable member closes the pinching opening, thereby frictionally pinching the rope.

U.S. Patent Application Pub. No. 2012/0247879 (Kowatsch et al.) describes an abseiling device for braking a load guided on a rope. The load is moved downward on the rope along with the abseiling device. The device comprises a movable part with two jaws that form part of a frictionally guided section. A manually actuable adjustment unit allows an operator to gauge the degree of force applied to the rope.

U.S. Pat. No. 8,820,487 (Bowman et al., 2014) discloses a rope arresting apparatus with a first end, a weighted second end, and a cam portion that exerts frictional force on the rope and a pinching portion of the device. When tension on the weighted second end of the rope is less than or equal to tension on the first end of the rope, the cam portion is in frictional contact with the rope. This frictional contact may be released by the operator by lifting the rope off of the cam portion while pressing the rope against the pinching portion.

U.S. Pat. No. 8,997,944 (Sadeck et al., 2015) and U.S. Pat. No. 9,365,400 (Sadeck et al., 2016) provide an automatic rope brake and lowering device in which a linear brake is partially situated within a brake housing that is mounted to a baseplate. The linear brake includes a braided cable, a collar attached to one end of the cable, and a member attached to the other end of the cable. A rope passes into a bore in the collar, through a tunnel formed by the braided cable and the collar, and exits the braided cable by passing between cable strands. The device further comprises an interface that is mounted to the baseplate and that extends the braided cable, thereby constricting it upon the rope.

U.S. Pat. No. 9,173,386 (Karpanty, 2015) discloses a line positioning device for use with fishing vessel outriggers. The device is comprised of a housing with a pulley, a resilient bushing positioned adjacent to the pulley, and a lever arm that is positioned to engage a halyard line against the resilient bushing. Partial rotation of the lever arm locks the line by pressing it against the resilient busing.

U.S. Pat. No. 9,186,527 (Bergmann et al., 2015) involves a rappelling device with a casing that is movable along a rope. A pulley and guide roller are rotatably supported so that the rope is held in frictional contact with the pulley. The apparatus comprises a braking device and a coupling device for suspending a load. The rope is placed into a channel that extends between a guide roller and the pulley.

U.S. Patent Application Pub. No. 2016/0001100 (Hirst et al.) discloses a fall arrest device with a cam member and a clutch. When the relative speed and/or acceleration of the fall arrest device and track member exceed a predetermined value, a trigger arm of the clutch moves the cam portion of the cam member toward the guide, thereby locking the track member between the cam member and the guide.

As is apparent from the above description of the prior art, none of these inventions is specifically configured to be utilized on a utility pole, and none of them incorporates the specific structural features of the present invention discussed more fully below.

BRIEF SUMMARY OF THE INVENTION

The present invention is a rope arrest-and-release device comprising a housing with a front, a back, and an internal recess, the housing comprising a pair of front vertical rollers situated on either side of the housing at the front of the housing, wherein each of the front vertical rollers rotates circumferentially about a vertical roller pin that is installed vertically within the housing, and wherein each of the front vertical rollers is configured to rotate forward at its base, and a pair of rear vertical rollers, each rear vertical roller being situated directly behind one of the front vertical rollers, wherein each of the rear vertical rollers rotates circumferentially about a vertical roller pin that is installed vertically within the housing, and two pairs of horizontal rollers, each pair of horizontal rollers being situated on either side of the housing to the interior of the front and rear vertical rollers on that side of the housing and oriented so that they extend from the rear to the front of the housing, wherein the horizontal rollers on each side of the housing are vertically parallel to one another and configured to allow a rope to pass between them; a cam block assembly configured to fit within the internal recess in the housing, the cam block being configured to be removable and reversible, the cam block assembly comprising a cam, a cam block, the cam being at least partially situated within the cam block, and a spring, the cam being configured rotate upward when the spring is relaxed and downward when the spring is compressed, the cam being further configured to pinch a rope against an inside ceiling of the housing when the earn is in an upward position; and means for attaching the device to a utility pole.

In a preferred embodiment, the inside ceiling of the housing is convex in shape so as to create a pressure point directly above the cam. Preferably, each of the front vertical rollers comprises a top end, and the housing comprises a spring pin arm and a spring that are configured to maintain the top ends of the front vertical rollers in place when the spring is relaxed and to allow the top ends of the front vertical rollers to rotate forward when the spring is compressed. The cam block is preferably supported on a pair of support rods that extend forward from an inside of a rear wall of the housing, and the cam block preferably comprises two cylindrical channels configured to receive the support rods.

In a preferred embodiment, the invention further comprises a pole interface that is configured to be attached to a rear surface of the housing, the pole interface having a front surface that is flat and a rear surface that is concave in shape to fit around at least part of a utility pole. Preferably, the pole interface comprises a rear surface that abuts up against the utility pole, and wherein the rear surface of the pole interface comprises a plurality of spikes. The cam preferably comprises an upper surface with a plurality of protrusions configured to increase friction between the upper surface of the cam and the rope.

In a preferred embodiment, the cam block assembly comprises a release cable having a cable loop, a cable crimp, and a cable attachment end, the cable attachment end being configured to secure the cable to a cable release attachment member on an outside surface of the cam; and the cam is configured to be locked in a downward position when a user pulls downward on the cable loop, slides the cable crimp through a key slot in a bottom of the cam block, and releases the cable loop.

REFERENCE NUMBERS

Figure 1:
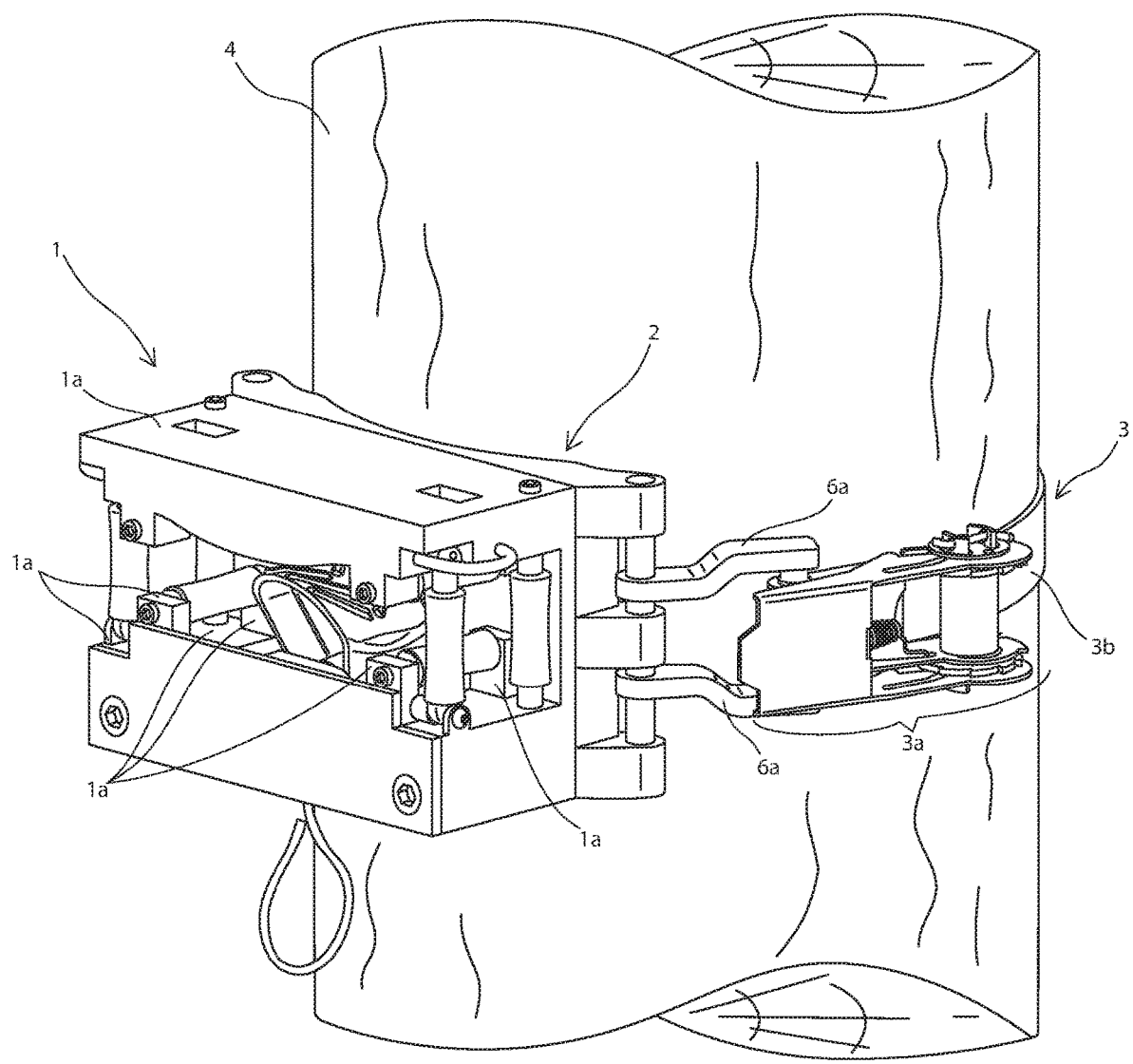
FIG. 1 is a perspective view of the present invention installed on a utility pole.

1 Main body assembly
1a Housing
1b Recess (in top part of housing)

1c Support rod
1d Front cover
1e Recess (internal to housing)
2 Pole interface
2a Lateral extension
2b Vertical aperture
2c Rod
3 Ratchet assembly
3a Ratchet mechanism
3b Strap
3c Hook
4 Utility pole
5a Front vertical roller
5b Rear vertical roller
5c Vertical roller pin
5d Roller pivot member
5e Roller pivot bolt
5f Bushing
6a First side hinge
6b Second side hinge
6c Tab
7 Spring
7a Spring pin arm
7b Spring stop
8 Cam block assembly
8a Cam block
8b Cam
8c Spring
8d Cam pin
8e Cable release attachment member
8f Central lateral bore
8g Ridges/protrusions
8h Key slot (on bottom of housing)
9 Horizontal roller
9a Horizontal roller pin
10 Release cable
10a Cable loop
10b Cable crimp
10c Cable attachment end
11 Rope
12 Spike
13 Bolt

DETAILED DESCRIPTION OF INVENTION

FIG. 1 is a perspective view of the present invention installed on a utility pole. As shown in this figure, the invention is comprised of a main body assembly 1, a pole interface 2, and a ratchet assembly 3. The ratchet assembly 3 comprises a ratchet mechanism 3a, a ratchet strap 3b, and a terminal hook 3c. The main body assembly 1 comprises a housing 1a, and the pole interface 2 is attached to the rear surface 1f of the housing 1a (see also FIG. 4). The ratchet mechanism 3a is attached to the pole interface 2 via a first side hinge 6a on a first lateral side of the pole interface 2. The strap 3b extends from the ratchet mechanism 3a around the utility pole 4, and terminates at the hook 3c. The hook 3c is attached to the pole interface 2 via a second side hinge 6b on a second lateral side of the pole interface 2. The pole interface 2 comprises a flat front surface and a rear surface that is concave in shape to fit the outer surface of the utility pole 4 (see also FIG. 15), thereby ensuring a snug fit between the device and the utility pole. The pole interface 2 may be a separate part that is attached to the housing 1a (see FIG. 4), or it may be the same part as the housing; that is, the housing 1a and pole interface 2 may be manufactured together as a single part.

Figure 2:
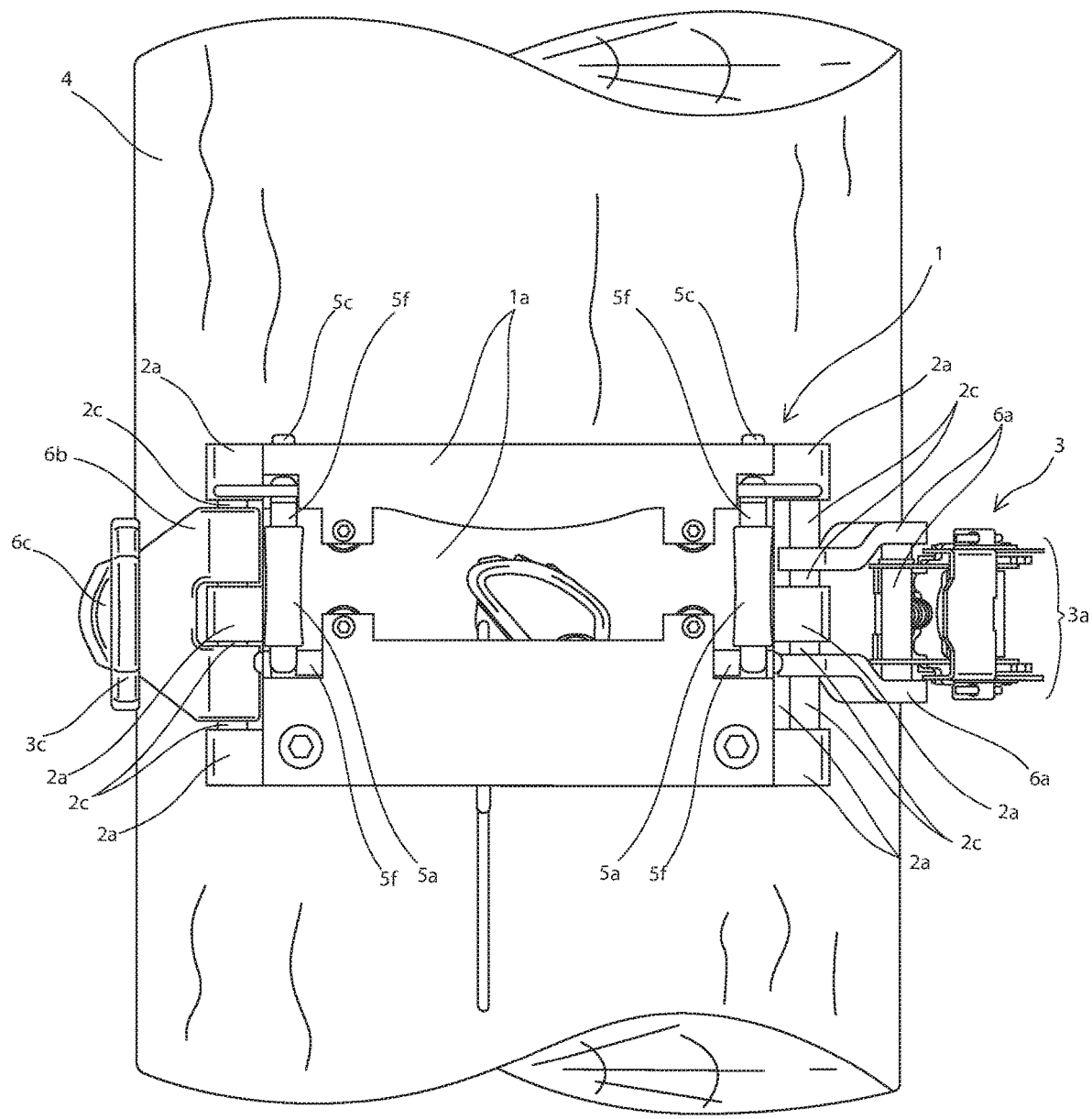
FIG. 2 is a front view of the present invention installed on a utility pole.

FIG. 2 is a front view of the present invention installed on a utility pole. As shown in this figure and in FIG. 1, on either side of the housing 1a is a pair of vertical rollers. Each pair of rollers comprises a front vertical roller 5a and a rear vertical roller 5b. The front vertical roller 5a is positioned directly in front of the rear vertical roller 5b. Each of the rear vertical rollers 5b rotates circumferentially about a vertical roller pin 5c (or shaft) that is installed vertically within the housing 1a. Rotatable bushings 5f are preferably situated on the vertical roller pin 5c on either end (top and bottom) of the rear vertical roller 5b.

Figure 4:
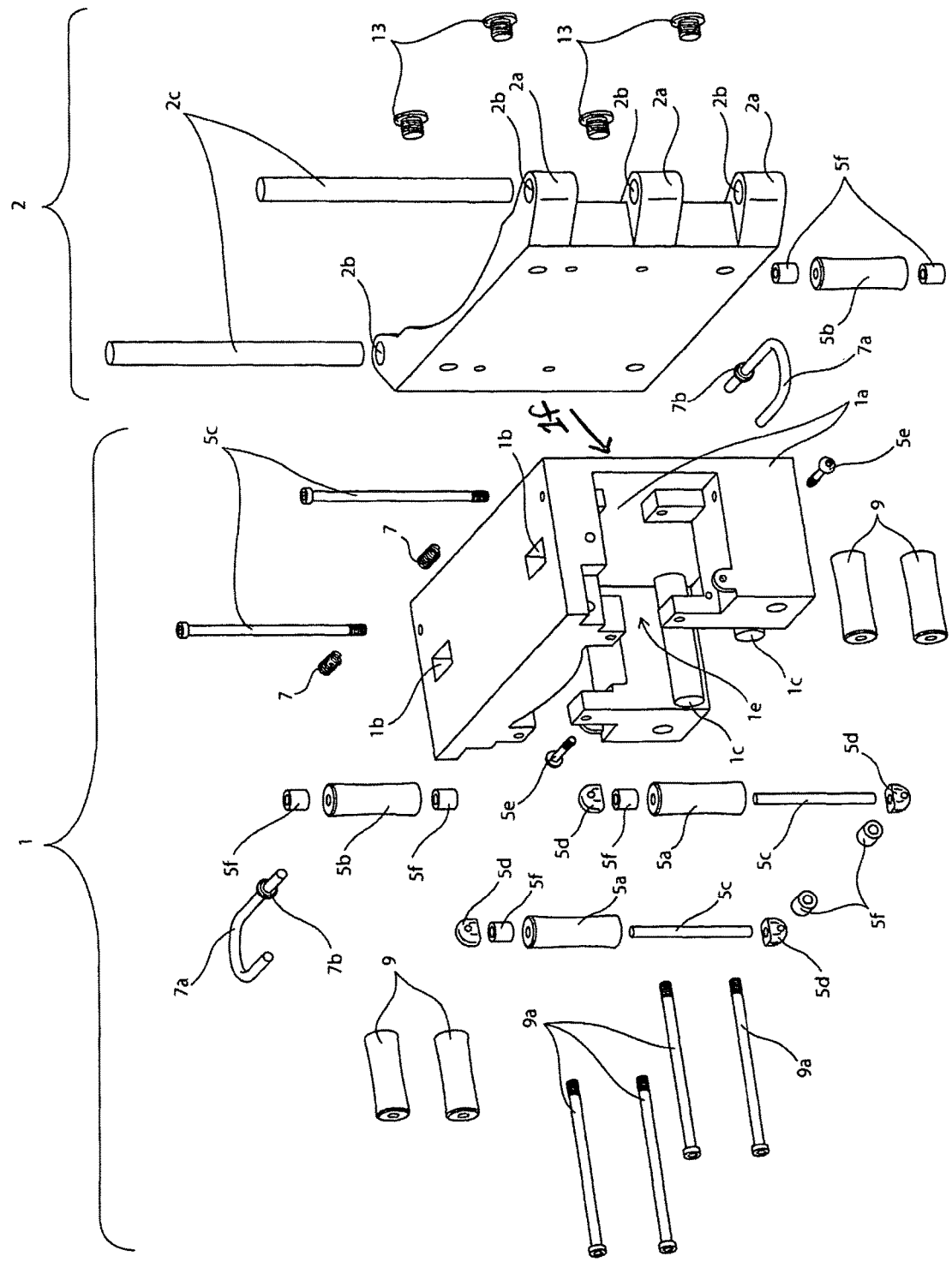
FIG. 4 an exploded view of the main body assembly of the present invention.

Also as shown in this figure and in FIG. 1, each lateral side of the pole interface 2 comprises a plurality of vertically aligned lateral extensions 2a with vertically oriented apertures 2b through which a rod 2c is inserted (see also FIG. 4). On the side of the pole interface 2 that is attached to the ratchet mechanism 3a, the first side hinge 6a connects the ratchet mechanism 3a to the rod 2c and allows the ratchet mechanism to swivel or rotate in relation to the rod. On the other side of the pole interface 2, a rod 2c extends similarly through a plurality of vertically aligned lateral extensions 2a. The second side hinge 6b comprises a tab 6c that is inserted through the center of the hook 3c, thereby connecting the hook 3c to the rod 2c (see also FIG. 15).

Figure 3:
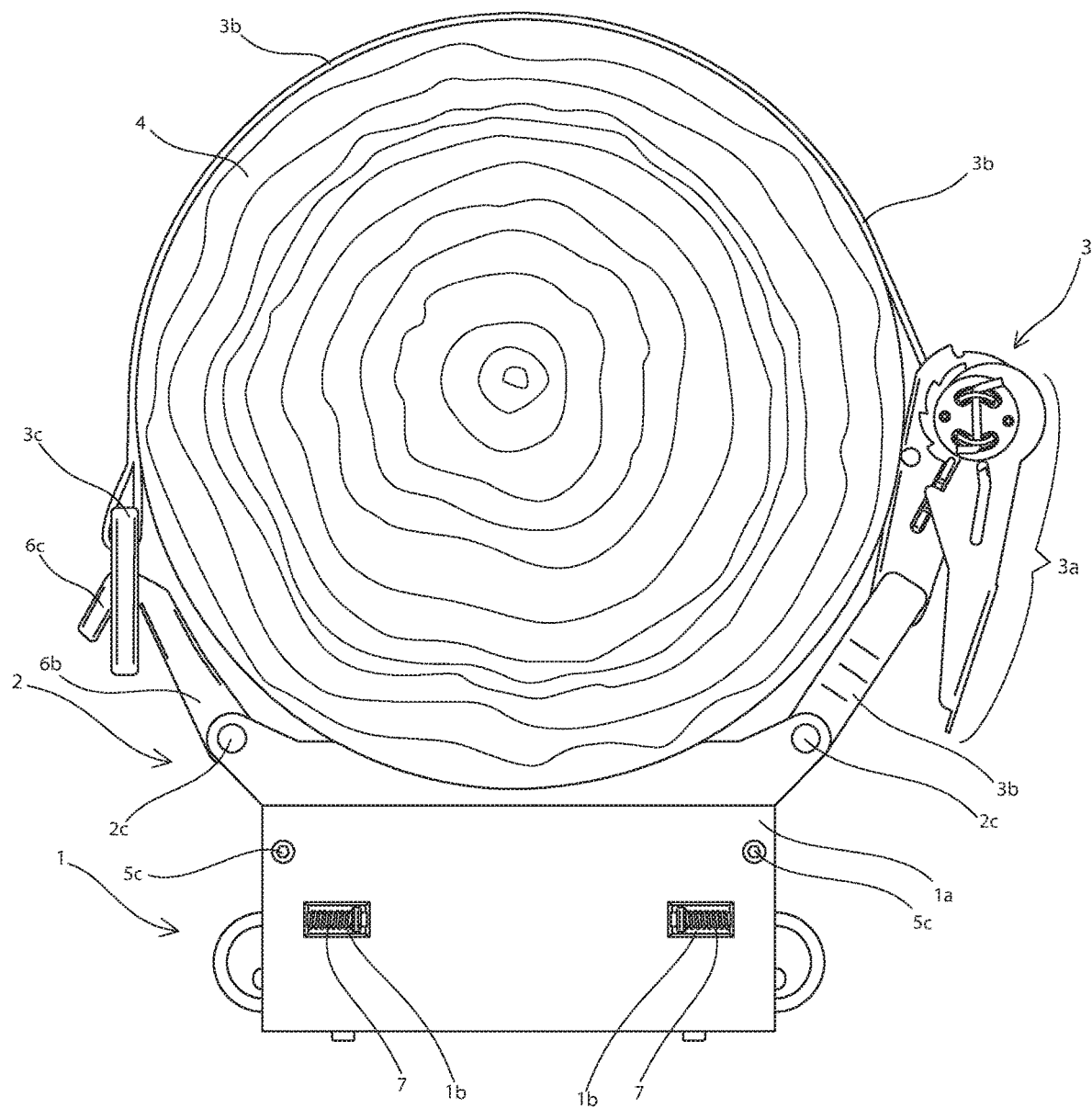
FIG. 3 is a top view of the present invention installed on a utility pole.

FIG. 3 is a top view of the present invention installed on a utility pole. As shown in this figure, the main body assembly 1a comprises two springs 7 (see also FIG. 4) that are situated inside of recesses 1b (see FIG. 4) in the top part of the housing 1a. The purpose of these springs will be discussed in connection with subsequent figures.

Figure 11:
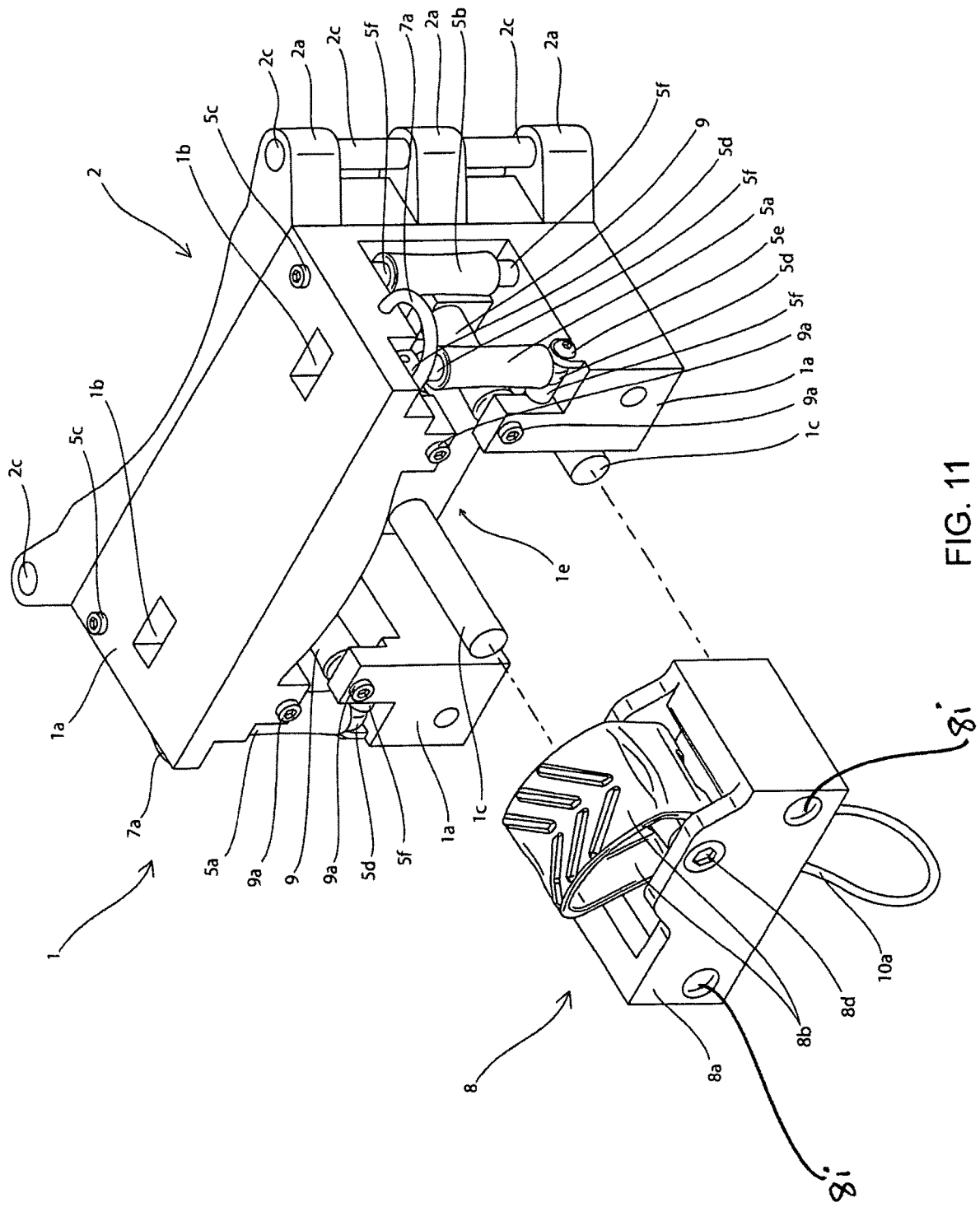
FIG. 11 is a partially exploded view of the present invention shown with the cam block assembly removed.

FIG. 4 an exploded view of the main body assembly of the present invention. In addition to the parts previously described, the invention comprises a plurality of bolts 13 that secure the pole interface 2 to the rear surface 1f of the housing 1a. The housing 1a is configured so as to form a large internal recess 1e into which the cam block assembly 8 is inserted (see FIG. 11). The cam block assembly 8 is supported on a pair of support rods 1c that extend forward from the inside of the rear wall of the housing 1a. These support rods 1c are shown in FIG. 4; as shown in FIG. 11, the support rods 1c extend through cylindrical channels 8i on either side of the bottom end of the cam block 8a. These cylindrical channels 8i extend the entire depth of the cam block 8a (this is necessary in order for the cam block to be reversed, as described in connection with FIG. 12). A spring pin arm 7a with a spring stop 7b proximate to its interior end is partially installed within and partially extends outwardly from the top part of the housing 1a on either side of the housing. The spring pin arm and spring stop are discussed more fully below in connection with FIGS. 6-8.

Figure 5:
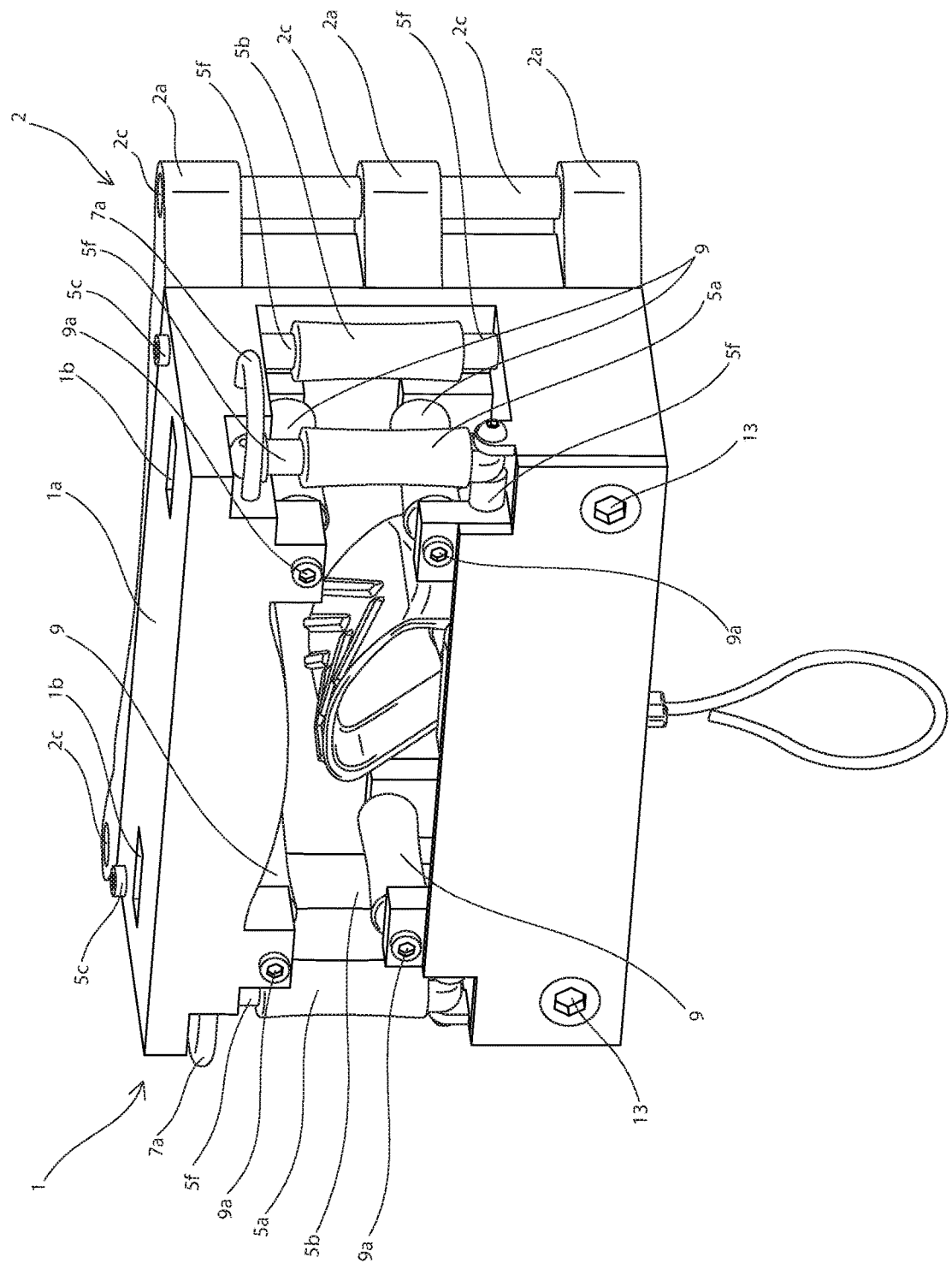
FIG. 5 is a perspective view of the present invention shown without the ratchet mechanism and ratchet strap.

FIG. 5 is a perspective view of the present invention shown without the ratchet mechanism and ratchet strap. As shown in this figure, the housing 1a contains four horizontal rollers 9 and four horizontal roller pins 9a about which the horizontal rollers 9 rotate. Each side of the housing 1a contains a pair of horizontal rollers 9 that are vertically aligned with one another (see also FIG. 2). The horizontal rollers 9 extend from the rear to the front of the housing 1a, and the rope passes between each pair of horizontal rollers 9 when it is inserted through the housing 1a (see FIG. 8). Note that the each pair of vertical rollers (a front roller 5a and a rear roller 5b on each side of the housing 1a) is situated to the outside of each pair of horizontal rollers 9.

The interior end (not shown) of the pin arm 7a is slidably inserted into a channel (not shown) in the top part of the housing 1a to the interior of recess 1b, and the spring 7 is situated between the spring stop 7b and the outer wall of the recess 1b (see FIG. 3). The distal end of the spring pin arm 7a is shaped like a hook and positioned to the exterior of the housing 1a, as shown in FIG. 5. This hook (distal end) of the spring pin arm 7a is configured to extend around the top end of the front vertical roller 5a. When in the position shown in FIG. 5, the front vertical roller 5a is prevented from pivoting forward by virtue of the hook (distal end) of the spring pin arm 5.

Figure 6:
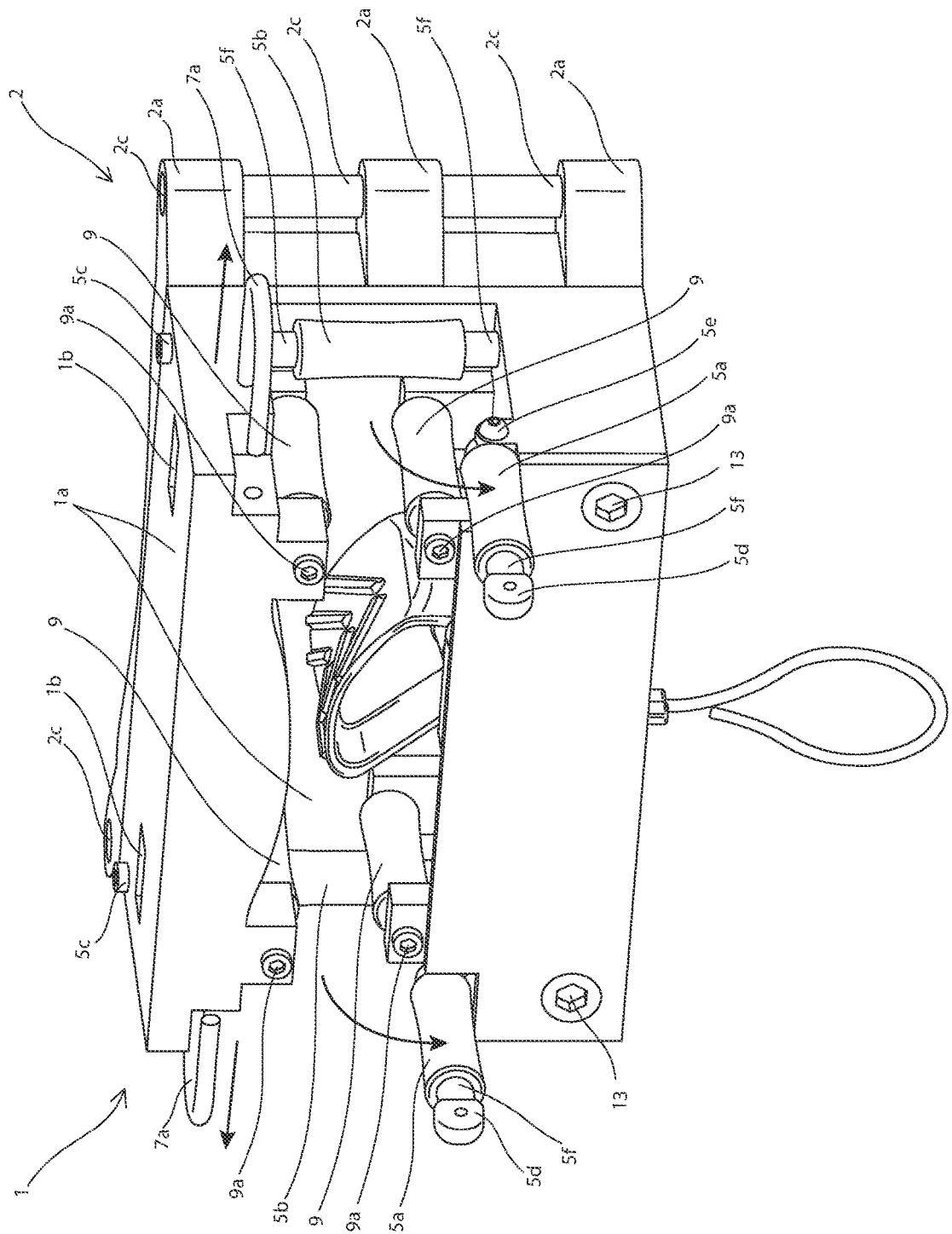
FIG. 6 is a perspective view of the present invention shown with the front vertical rollers rotated forward and the spring pin arm laterally extended.

FIG. 6 is a perspective view of the present invention shown with the front vertical rollers rotated forward and the spring pin arm laterally extended. When the operator pulls on the hook end of the spring pin arm 7a, the spring 7 is compressed (the degree of compression is limited by the spring stop 7b), and the spring arm 7a is able to be pulled far enough away from the exterior surface of the housing 1a that the top end of the front vertical roller 5a is released from the grip of the hook, and the front vertical roller 5a may be rotated forward. Each of the front vertical rollers 5a pivots at its bottom end. The bottom end of the front roller 5a is inserted into a roller pivot member 5d (see FIG. 4), which is rotatably secured within the housing 1a by a roller pivot bolt 5e. A bushing 5f is situated on the bolt 5e to the inside of roller pivot member 5d such that both the pivot member 5d and the bushing 5f pivot (or rotate) on the bolt 5e. Note that the housing 1a is constructed so as to provide side supports for the pivot member 5d and bushing 5f (that is, to prevent them from sliding laterally on the bolt 5e).

Figure 7:
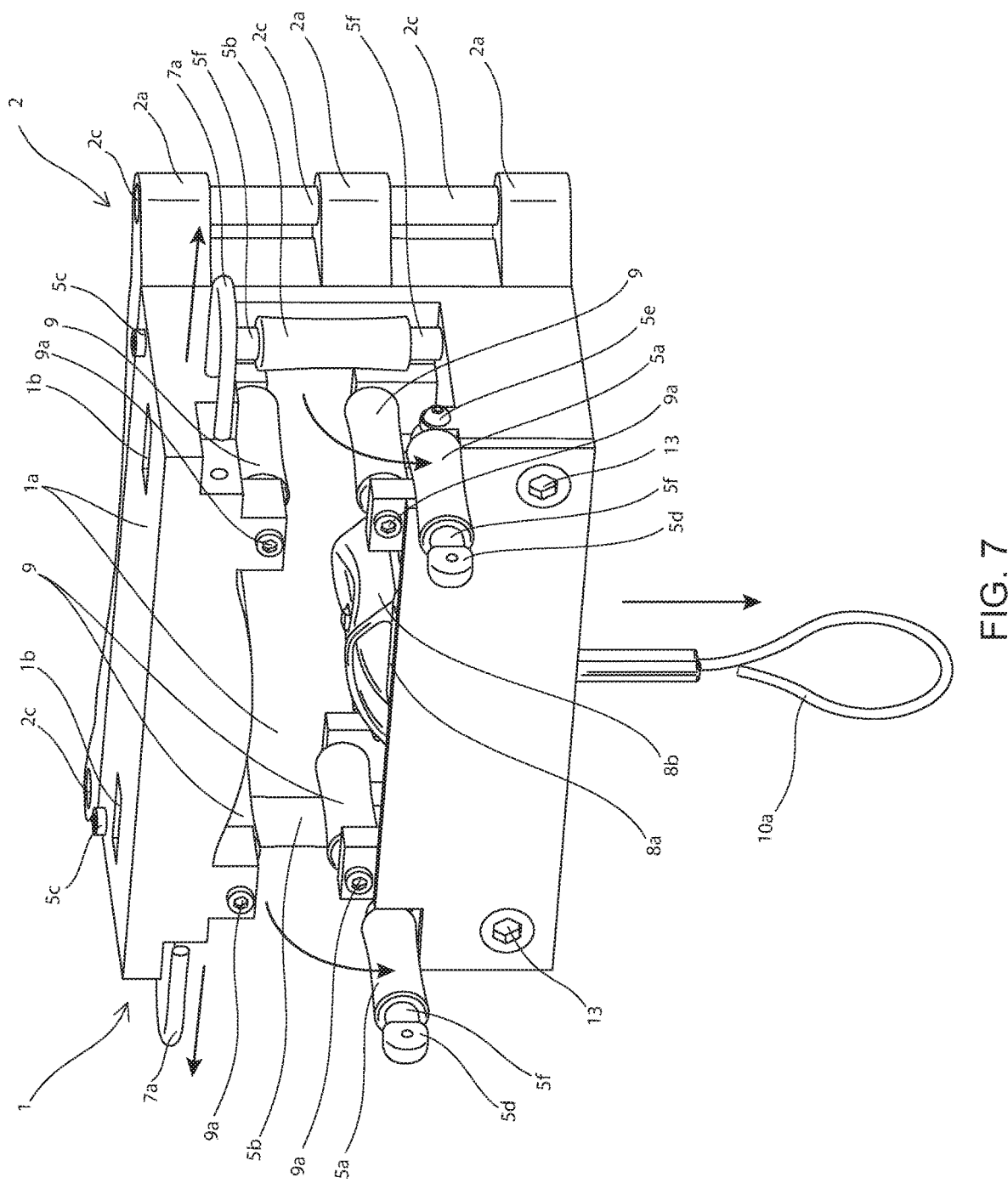
FIG. 7 is a perspective view of the present invention shown with the front vertical rollers rotated forward, the spring pin arm laterally extended, and the cam retracted.

FIG. 7 is a perspective view of the present invention shown with the front vertical rollers rotated forward, the spring pin arm laterally extended, and the cam retracted. Once the spring pin arm 7a has been extended and the front vertical rollers 5a rotated forward, the operator grabs onto the cable loop 10a (either manually or with an instrument such as a pole or rod) and pulls downward. This action causes the cam 8b within the cam block 8a to rotate downward, as described more fully below in connection with FIG. 14.

Figure 8:
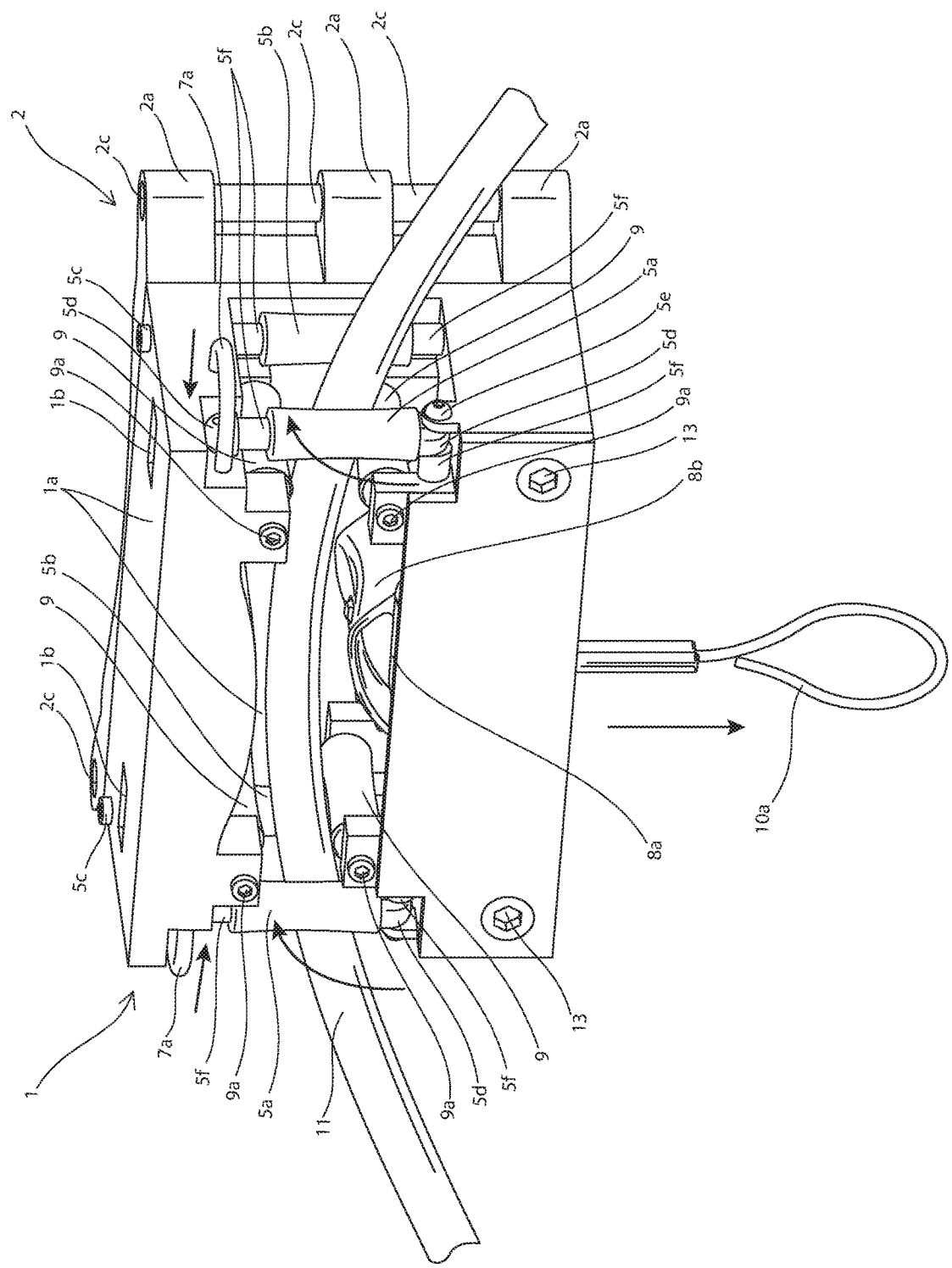
FIG. 8 is a perspective view of the present invention shown with a length of rope inserted through the device and the cam retracted.

FIG. 8 is a perspective view of the present invention shown with a length of rope inserted through the device and the cam retracted. With the front vertical rollers 5a pivoted forward and the cam 8b in a downward (disengaged) position, a rope 11 can be inserted into the housing 1a. The rope 11 is inserted between the two vertical rollers and between the two horizontal rollers on one side of the housing 1a, passes over the cam 8b, and exist the housing 1a in between the two vertical rollers and two horizontal rollers on the other side of the housing, as shown. The fact that the vertical and horizontal rollers rotate facilitates the passage of the rope into and out of the housing.

Figure 9:
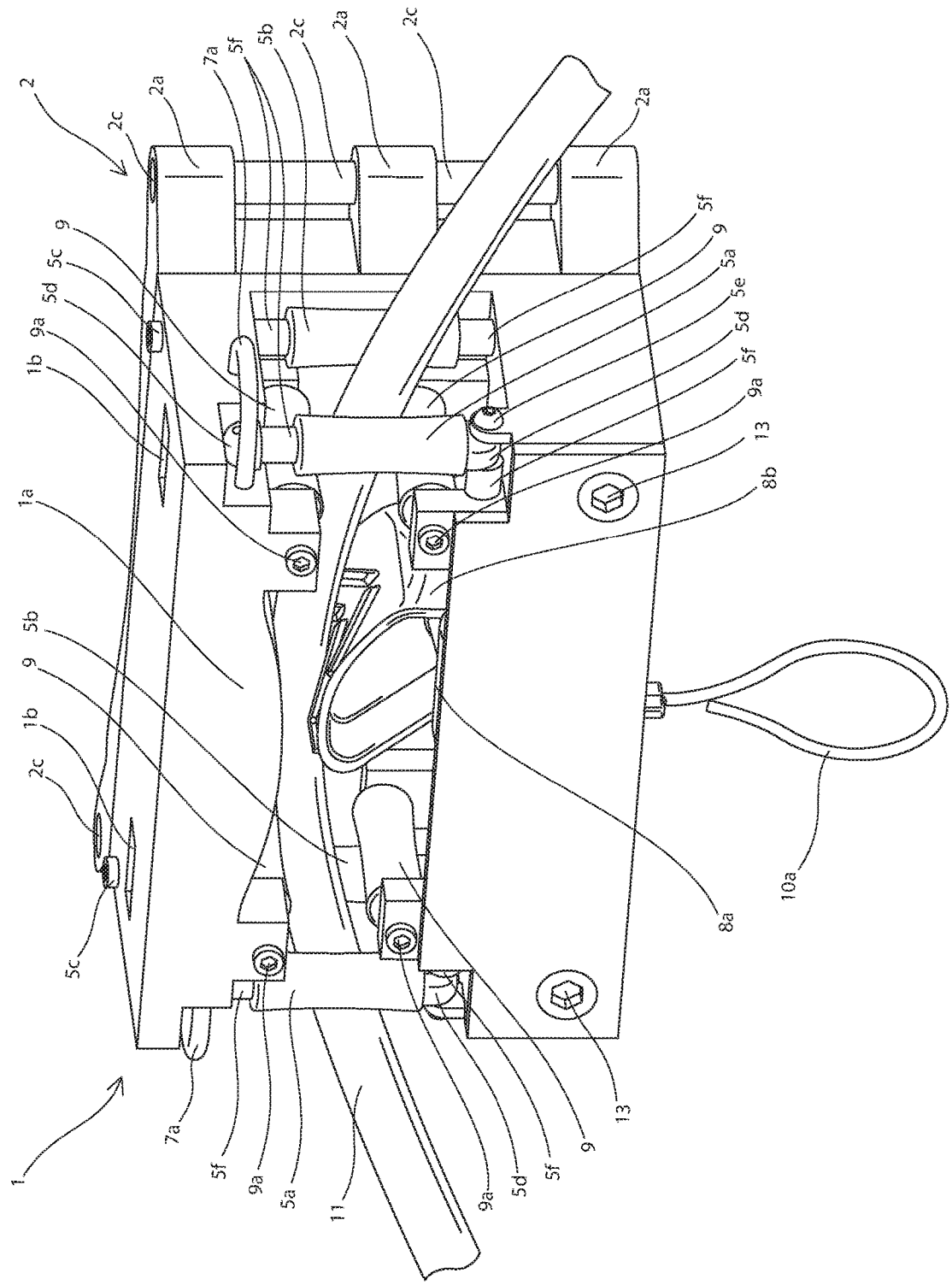
FIG. 9 is a perspective view of the present invention shown with a length of rope inserted through the device and the cam in a pinched position.

FIG. 9 is a perspective view of the present invention shown with a length of rope inserted through the device and the cam in a pinched position. Once the operator releases the downward pressure on the cable loop 10a, the cam 8b rotates upward. The mechanism that enables the downward and upward rotation of the cam 8b is explained more fully below in connection with FIG. 14. With the cam 8b in an upward (engaged) position, the rope 11 is pinched against the inside ceiling of the housing 1a. In a preferred embodiment, the inside ceiling of the housing is convex in shape (as shown in FIG. 9) so as to create a pressure point directly above the cam 8b.

Figure 10:
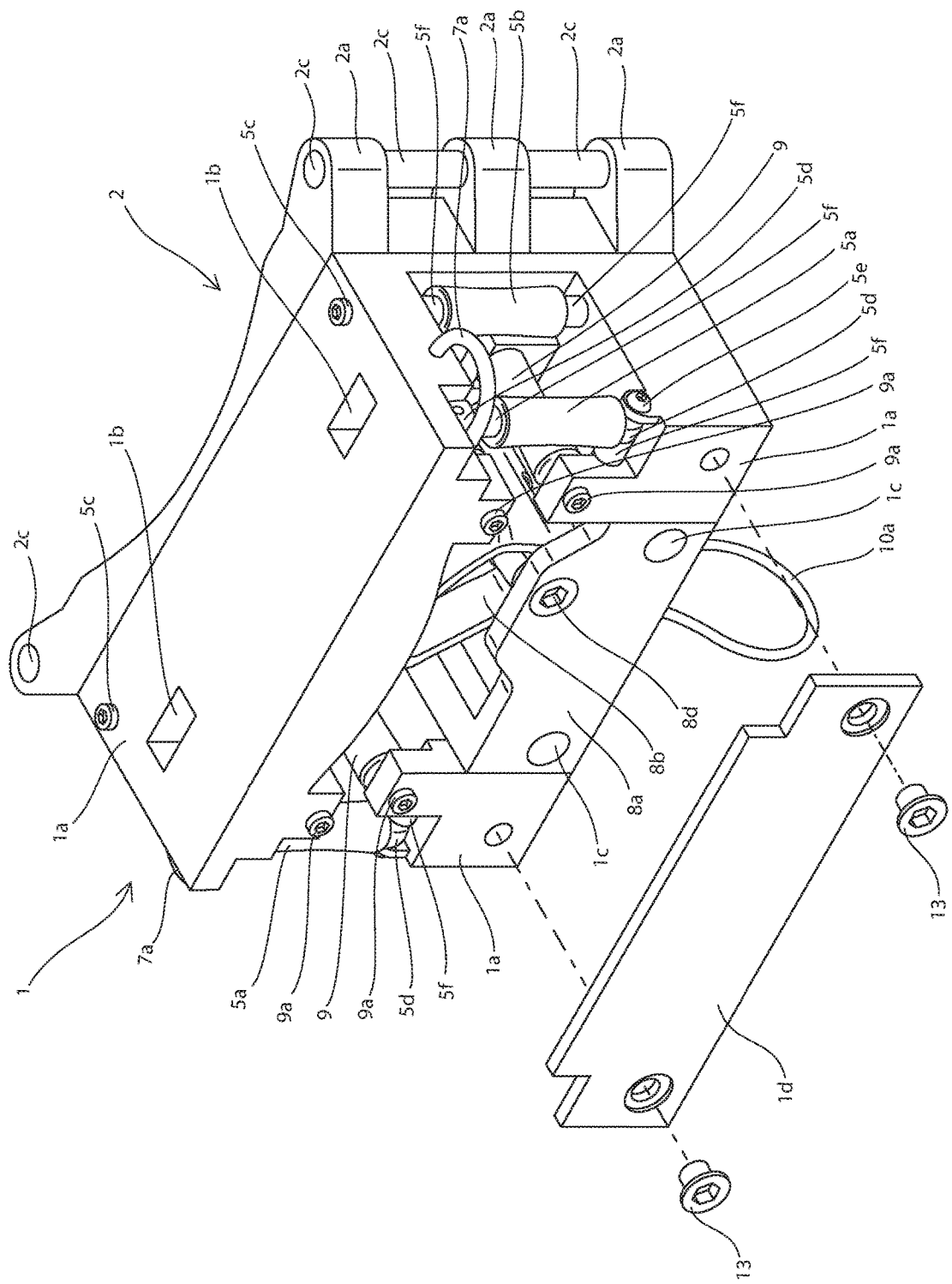
FIG. 10 is a partially exploded view of the present invention shown with the front cover removed.

FIG. 10 is a partially exploded view of the present invention shown with the front cover removed. As shown in FIG. 10, the front cover 1d is preferably configured to cover the front end of the cam block 8a and a portion of the housing 1a on either side of the cam block. With the front cover 1d removed, the cam block assembly 8 can now be slid off of the support rods 1c and removed from the housing 1a, as shown in FIG. 11.

Figure 12:
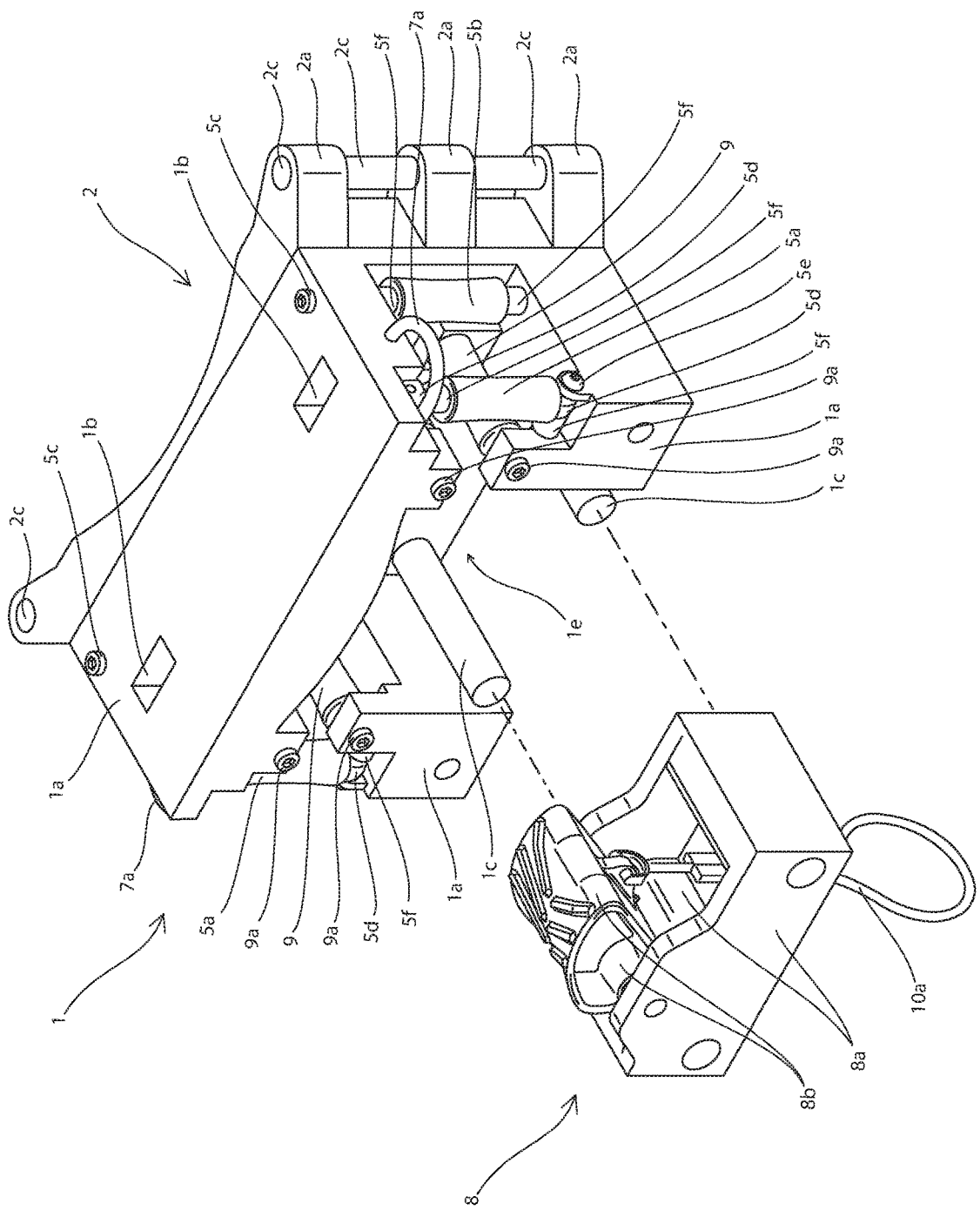
FIG. 12 is a partially exploded view of the present invention shown with the cam block assembly reversed.
Figure 13:
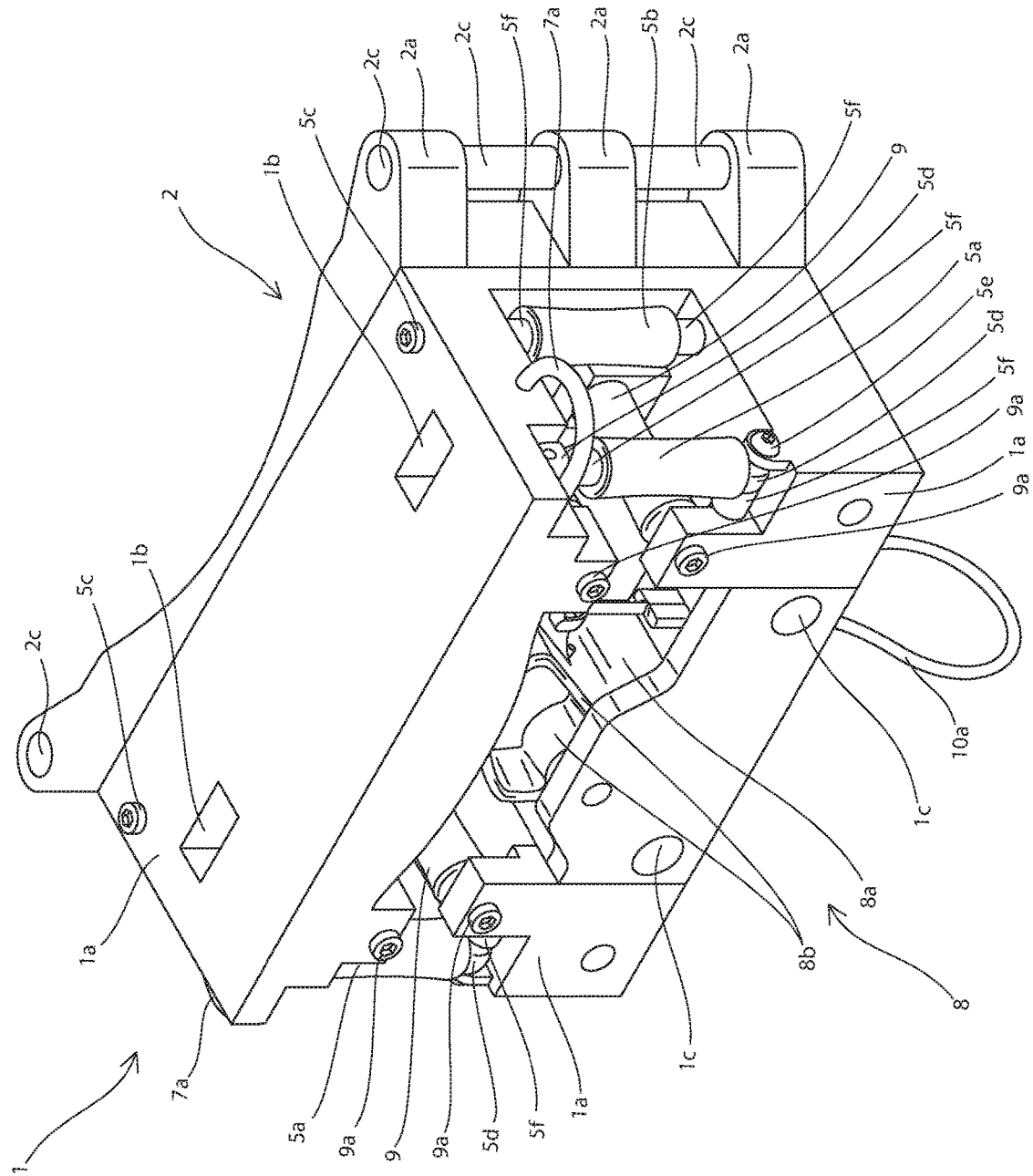
FIG. 13 is a perspective view of the present invention shown with the cam block assembly reversed and reinserted.

FIG. 12 is a partially exploded view of the present invention shown with the cam block assembly reversed. Once the cam block assembly 8 is removed from the housing 1a, it can be reversed and reinserted into the housing by sliding the cam block 8a back onto the support rods 1c. This allows the rope to be inserted in either direction (left to right or vice versa). FIG. 13 is a perspective view of the present invention shown with the cam block assembly reversed and reinserted (but without the front cover 1d).

Figure 14:
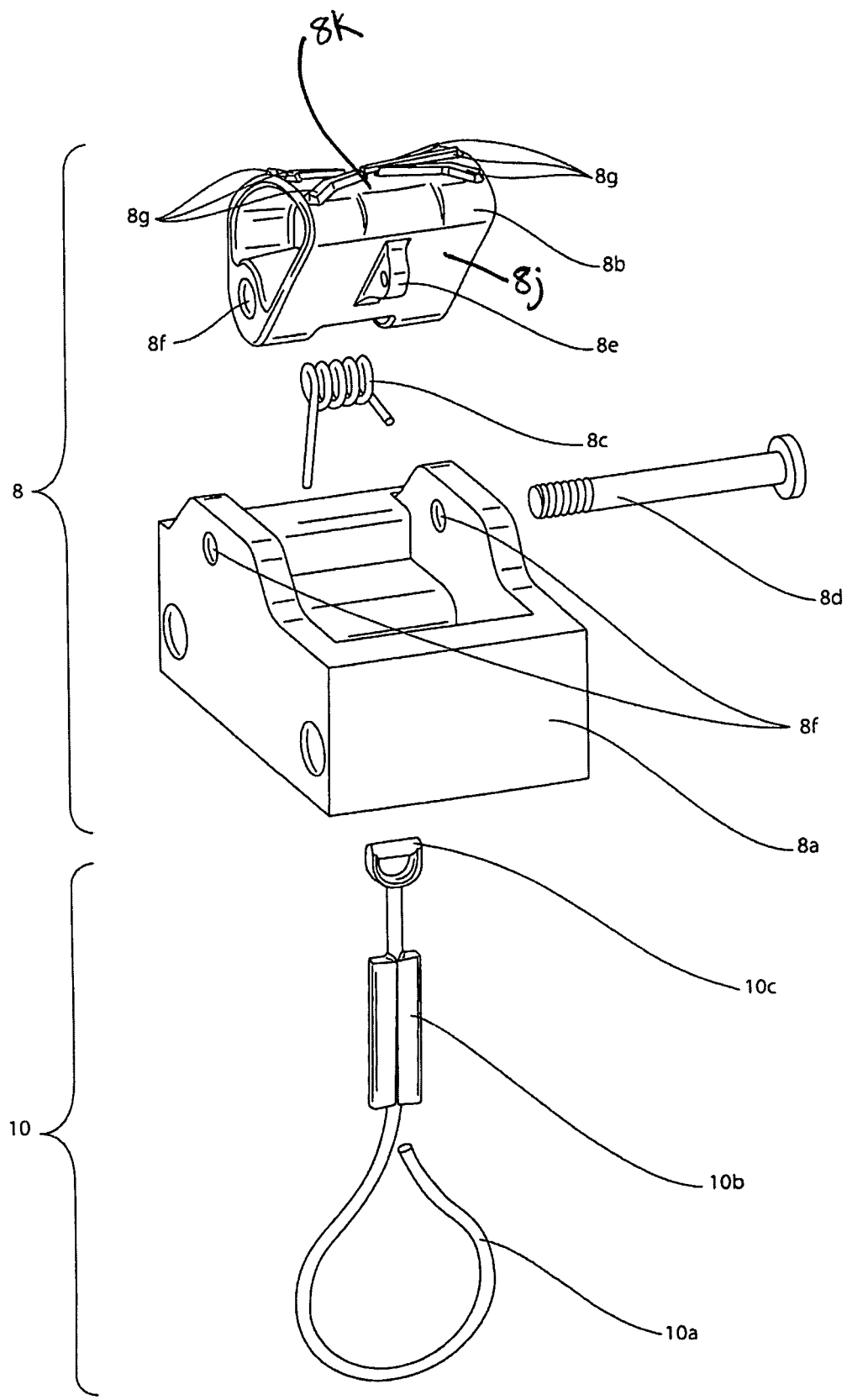
FIG. 14 is an exploded view of the cam block assembly.

FIG. 14 is an exploded view of the cam block assembly. As shown in this figure, the cam block assembly 8 comprises a cam block 8a, a cam 8b, a spring 8c, a cam pin 8d, and a release cable 10. The release cable 10 comprises a cable loop 10a, cable crimp 101), and cable attachment end 10c. The cable attachment end 10c secures the cable to the cable release attachment member 8e on the outside surface 8j of the cam 8b. The function of the cable loop 10a has been previously described. The cable crimp 10b crimps the wire so that it can exist in loop form, but it also serves the purpose of locking the cable in the key slot 8h (see FIG. 16).

The cam 8b itself is preferably shaped as shown in FIG. 14, with a central lateral bore 8f on its lower end and a plurality of ridges or protrusions 8g on its upper surface 8k to create greater friction against the rope. The pin 8d extends through holes in the outer walls at the top part of the cam block 8a and through the central lateral bore 8f in the cam 8b, and the spring 8c is positioned around the center of the pin 8d inside the bottom part of the cam 8b. The spring is configured such that when the operator pulls downward on the cable loop 11a, thereby pulling downward that side of the cam on which the release attachment member 8e is situated, the spring 8c is compressed. When the operator or releases this pressure, the spring 8c causes the cam to rotate on the pin 8d into the pinched (or engaged) position shown in FIG. 9.

Figure 15:
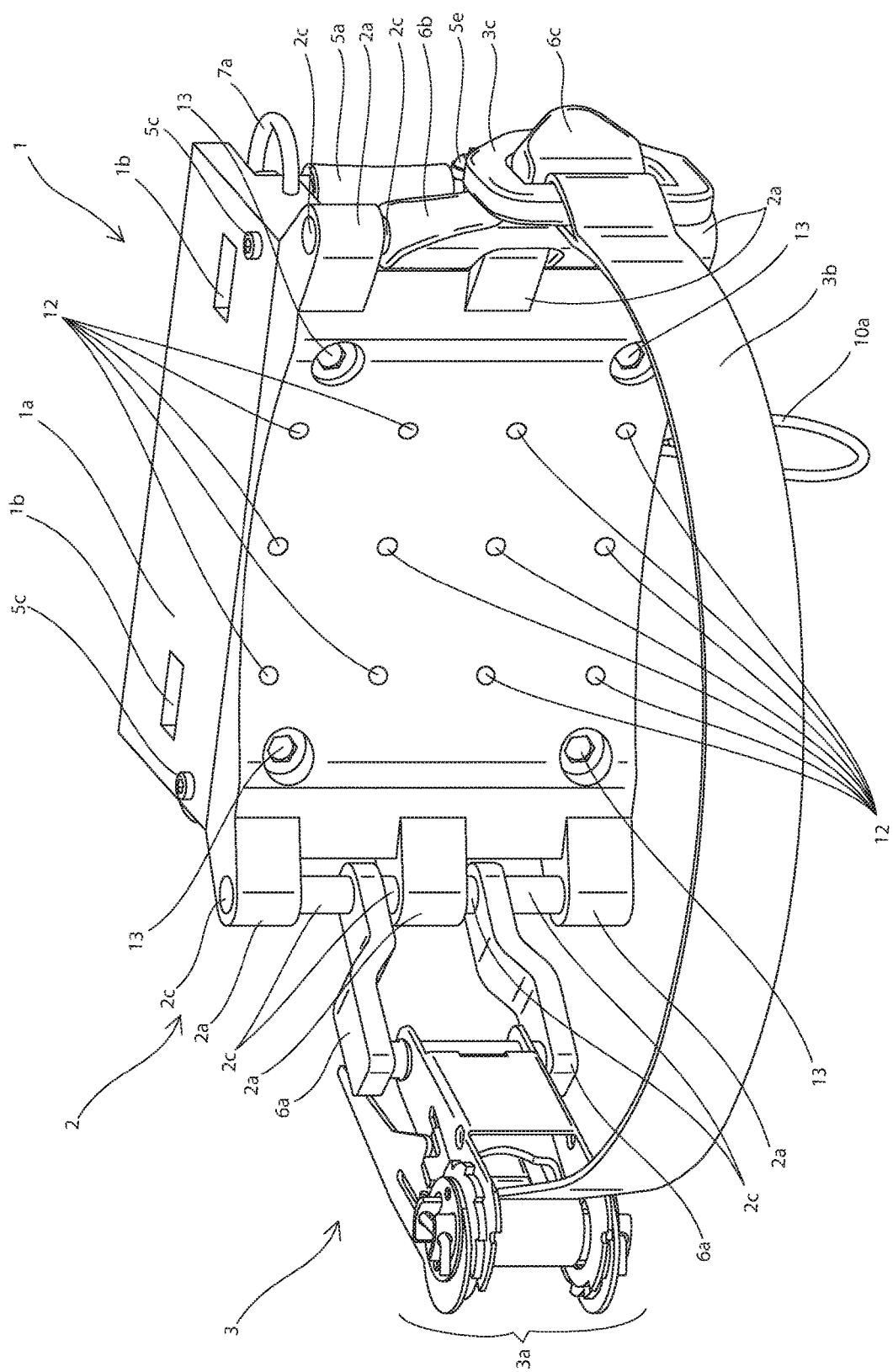
FIG. 15 is a rear perspective view of the present invention showing the ratchet mechanism and ratchet strap.

FIG. 15 is a rear perspective view of the present invention showing the ratchet mechanism and ratchet strap. In a preferred embodiment, the pole interface 2 is secured to the utility pole with the ratchet assembly 3 shown in the drawings; however, the present invention is not limited to any particular means of securing the pole interface 2 to the utility pole. For example, the pole interface 2 may be secured to the utility pole with a strap, cord, cable, rope or webbing that incorporates hook-and-loop fasteners, snaps, buckles, clips or any other mechanism or feature that allows the strap to be tightened or loosened around the pole. In a preferred embodiment, the rear surface of the pole interface 2 comprises a plurality of spikes 12 to provide traction between the rear surface of the pole interface 2 and the utility pole 4.

Figure 16:
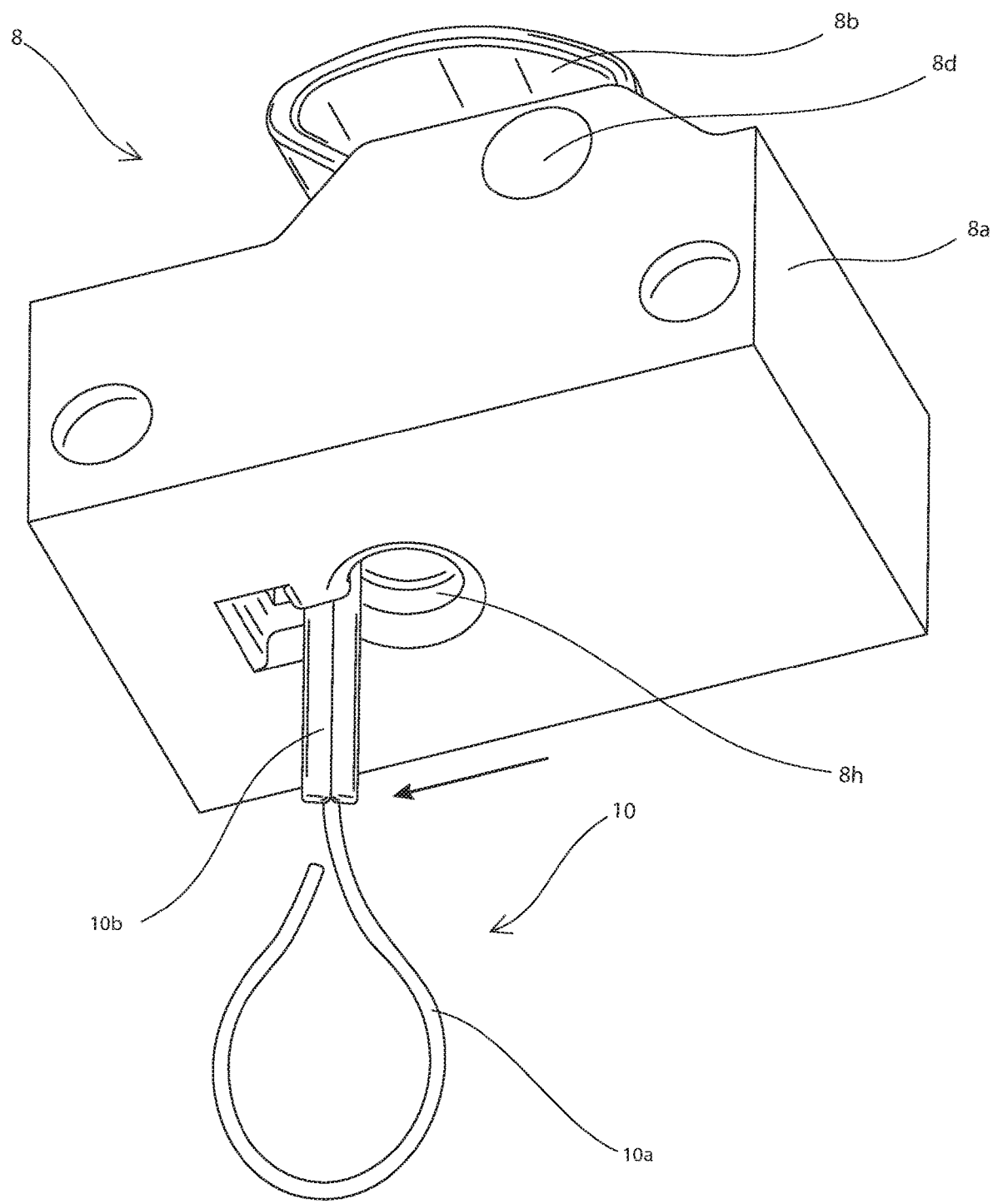
FIG. 16 is a detail perspective view of the bottom of the housing.

FIG. 16 illustrates the mechanism for locking the cam 8b in an open (or disengaged) position. The user pulls down in the cable loop 10a, slides the cable crimp 10b through the key slot 8h in the bottom of the cam block 8a, and then releases the cable loop 10a, thereby causing the crimp 10b to abut up against the central protrusion in the key slot 8h and locking the cable in place. To release the cam 8b from the locked position, the user would pull down on the cable loop 10a, slide the cable crimp 10b back through the key slot 8h (toward the circular part of the key slot 8h), and then release the cable.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A rope arrest-and-release device comprising:
   (a) a housing with a front, a back, and an internal recess, the housing comprising:
      (i) a pair of front vertical rollers situated on either side of the housing at the front of the housing, wherein each of the front vertical rollers rotates circumferentially about a first vertical roller pin that is installed vertically within the housing, and wherein each of the front vertical rollers is configured to rotate forward at its base;
      (ii) a pair of rear vertical rollers, each rear vertical roller being situated directly behind one of the front vertical rollers, wherein each of the rear vertical rollers rotates circumferentially about a second vertical roller pin that is installed vertically within the housing; and
      (iii) two pairs of horizontal rollers, each pair of horizontal rollers being situated on the either side of the housing inwardly of the front and rear vertical rollers on the side of the housing and oriented so that the horizontal rollers extend from the back to the front of the housing, wherein the horizontal rollers on each of the sides of the housing are vertically parallel to one another and configured to allow a rope to pass between the horizontal rollers;
   (b) a cam block assembly configured to fit within the internal recess in the housing, the cam block assembly being configured to be removable and reversible, the earn block assembly comprising:
      (i) a cam;
      (ii) a cam block, the cam being at least partially situated within the cam block; and
      (iii) a spring, the cam being configured to rotate upward when the spring is relaxed and downward when the spring is compressed, the cam being further configured to pinch the rope against an inside ceiling of the housing when the cam is in an upward position; and
   (c) means for attaching the device to a utility pole.

2. The device of claim 1, wherein the inside ceiling of the housing is stationary and convex in shape so as to create a pressure point directly above the cam.

3. The device of claim 1, wherein each of the front vertical rollers comprises a top end, and wherein the housing comprises a spring pin arm and a spring that are configured to maintain the top ends of the front vertical rollers in place when the spring is relaxed and to allow the top ends of the front vertical rollers to rotate forward when the spring is compressed.

4. The device of claim 1, wherein the cam block is supported on a pair of support rods that extend forward from an inside of a rear wall of the housing, wherein the first pair of horizontal rollers lies on a first horizontal plane, wherein the second pair of horizontal rollers lies on a second horizontal plane, wherein the second horizontal plane is lower than the first horizontal plane, wherein the pair of support rods lies on a third horizontal plane that is lower than the second horizontal plane, wherein the support rods are situated inwardly of the first and second pairs of horizontal rollers, and wherein the cam block comprises two cylindrical channels configured to receive the support rods.

5. The device of claim 1, further comprising a pole interface that is configured to be attached to a rear surface of the housing, the pole interface having a front surface that is flat and a rear surface that is concave in shape to fit around at least part of the utility pole.

6. The device of claim 5, wherein the rear surface of the pole interface abuts up against the utility pole, and wherein the rear surface of the pole interface comprises a plurality of spikes.

7. The device of claim 1, wherein the earn comprises an upper surface with a plurality of protrusions configured to increase friction between the upper surface of the cam and the rope.

8. The device of claim 1, wherein the cam block assembly comprises a release cable having a cable loop, a cable crimp, and a cable attachment end, the cable attachment end being configured to secure the cable to a cable release attachment member on an outside surface of the cam; and
   wherein the cam is configured to be locked in a downward position when a user pulls downward on the cable loop, slides the cable crimp through a key slot in a bottom of the cam block, and releases the cable loop.

9. The device of claim 1, wherein the front vertical rollers, the rear vertical rollers, and the horizontal rollers each has a size, and all of the rollers are the same size.

10. The device of claim 3, wherein each of the front vertical rollers comprises a bottom end;
   wherein the bottom end of the front roller comprises a first roller pivot member;
   wherein the top end of the front roller comprises a second roller pivot member;
   wherein the first roller pivot member is rotatably secured within the housing by a roller pivot bolt;
   wherein a first bushing is situated on the roller pivot bolt adjacent to and inwardly of the first roller pivot member;
   wherein a second bushing is situated on the first vertical roller pin between the second roller pivot member and the top end of the front vertical roller;
   wherein the housing comprises side supports that are configured to prevent the first roller pivot member from sliding laterally on the roller pivot bolt;
   wherein each of the rear vertical rollers comprises a top end and a bottom end;
   wherein a third bushing is situated on the second vertical roller pin between the bottom end of the rear vertical roller and the housing; and
   wherein a fourth bushing is situated on the second vertical roller pin between the top end of the rear vertical roller and the housing.

* * * * *